United States Patent [19]

Trovinger

[11] 3,976,001
[45] Aug. 24, 1976

[54] POWER JUICER

[76] Inventor: Harry R. Trovinger, 1051 N. Lincoln Ave., Lodi, Calif. 95240

[22] Filed: July 9, 1973

[21] Appl. No.: 377,413

[52] U.S. Cl. ............................................. 99/513
[51] Int. Cl.² ..................... A23N 1/00; B04B 5/10
[58] Field of Search ........................... 99/510–513

[56] References Cited
UNITED STATES PATENTS

| | | | |
|---|---|---|---|
| 2,315,028 | 3/1943 | Thomas | 99/513 |
| 2,345,683 | 4/1944 | Owens | 99/513 X |
| 2,510,420 | 6/1950 | Ross | 99/513 X |
| 2,513,974 | 7/1950 | Thomas | 99/513 X |
| 2,864,419 | 12/1958 | Woock | 99/513 |

Primary Examiner—Jerry W. Myracle
Assistant Examiner—Charles Gorenstein
Attorney, Agent, or Firm—Blair & Brown

[57] ABSTRACT

A power juicer including a motor driven rotor formed of nylon and having a plurality of stainless steel saw blades cast into the nylon and extending radially outwardly therefrom to serve as cutters. A screened opening is positioned beneath the cutters for permitting the juice to pass therethrough. A screw threaded front unloading attachment is secured to the rotor for feeding the pulp and other solids to a disposal sack attached to the end of the juicer body. The front unloading attachments are interchangeable and have ¼, ½ and ¾ turns on the screw threads thereof.

1 Claim, 12 Drawing Figures

U.S. Patent    Aug. 24, 1976    Sheet 1 of 3    3,976,001
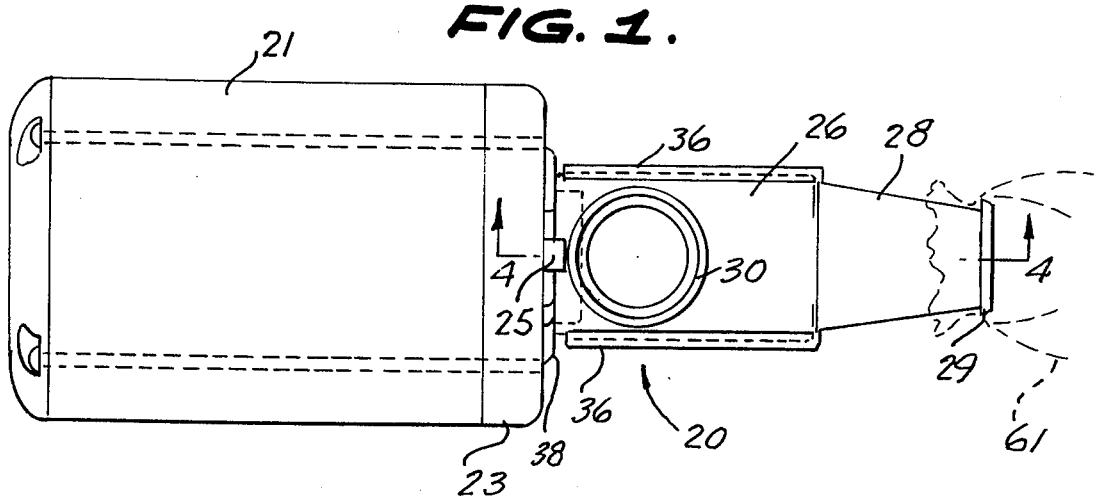
FIG. 1.
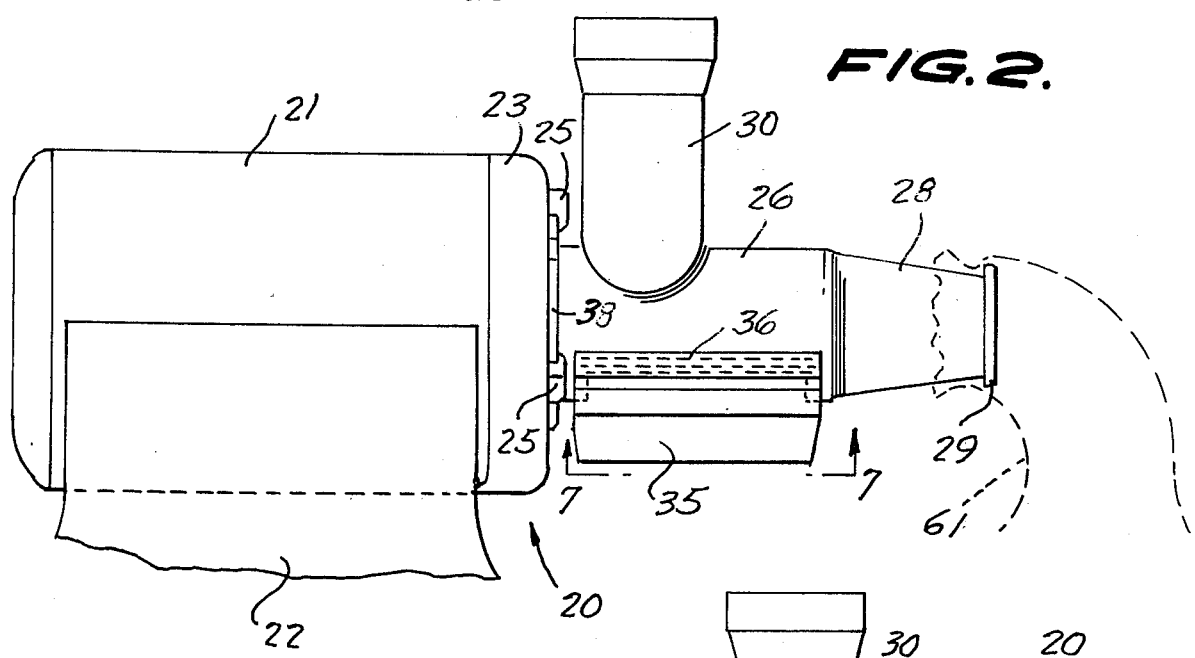
FIG. 2.
FIG. 7.
FIG. 3.
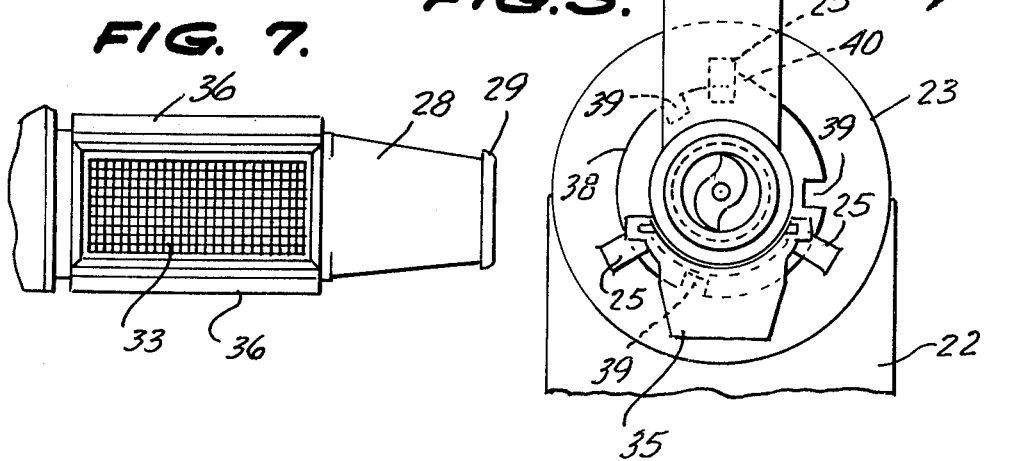

U.S. Patent   Aug. 24, 1976   Sheet 3 of 3   3,976,001
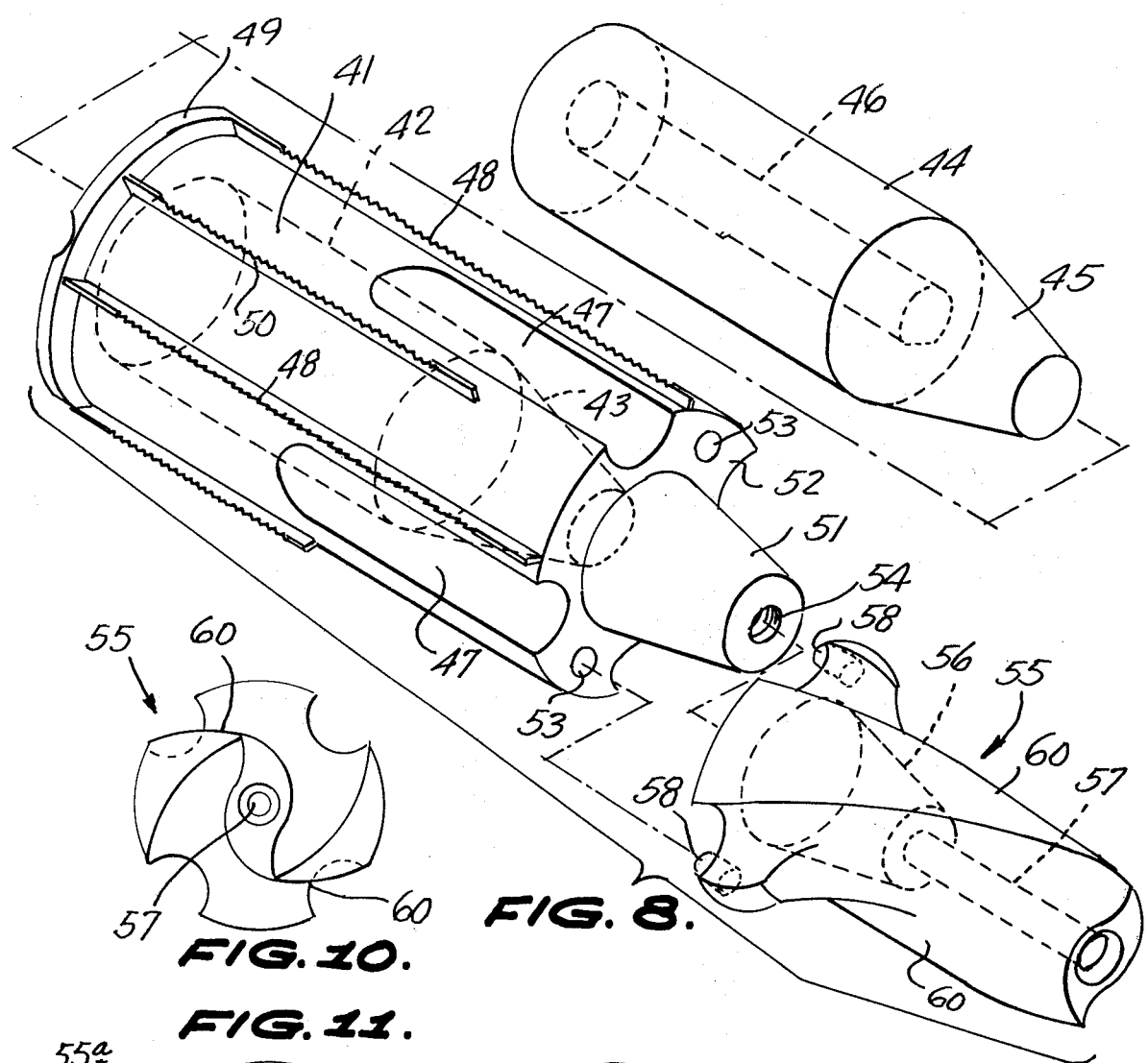
FIG. 8.
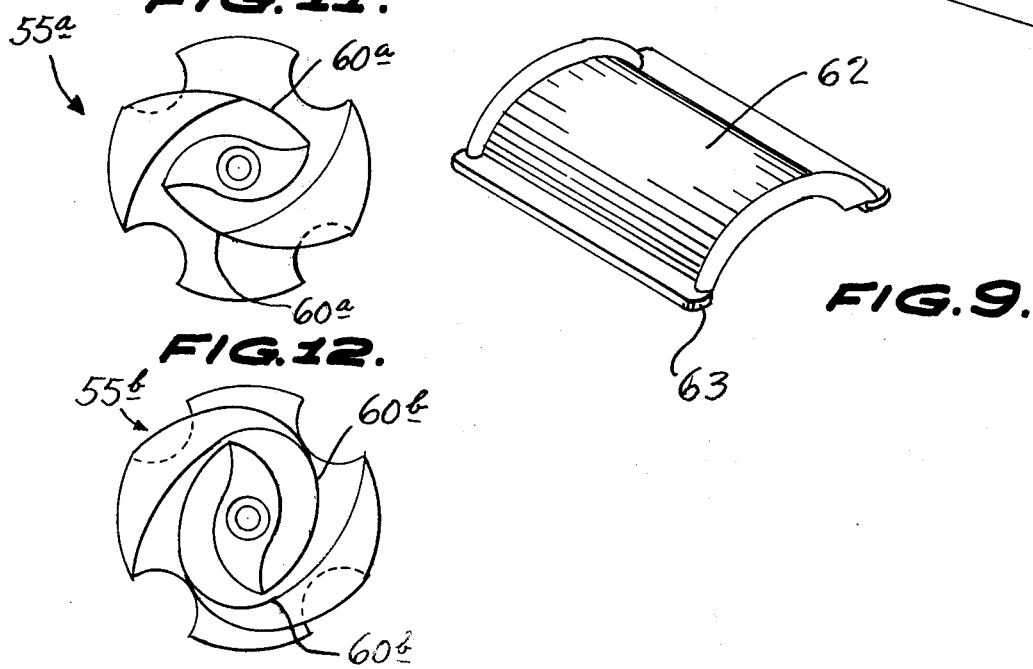
FIG. 10.
FIG. 11.
FIG. 12.
FIG. 9.

3,976,001

POWER JUICER

BACKGROUND OF THE INVENTION

Field of the Invention

The present invention relates to power juicers and is an improvement on the patent to Walter R. J. Woock, U.S. Pat. No. 2,864,419, issued Dec. 16, 1958 and entitled "Juicer".

SUMMARY OF THE INVENTION

The present juicer has a juicer body with a cutting rotor mounted for rotation therein on the shaft of an electric motor. The cutting rotor is equipped with saw blade cutters molded into the nylon material of the rotor. Unloading attachments are secured to the outer end of the rotor with screw threads of ¼, ½ and ¾ turns respectively arranged interchangeably to unload the pulp and other solid material through the end of the body. A screen underlies the rotor cutters to permit the juice to pass therethrough and a hopper is secured to the body for feeding materials to be juiced to the juicer body.

The primary object of the invention is to provide a juicer which will be highly efficient in operation and can be used interchangeably for rooty or solid vegetables, leafy green vegetables and for all foods to be homogenized such as, vegetables, fruits, nut butters, ice creams and sherberts.

Other objects and advantages will become apparent in the following specification when considered in light of the attached drawings.

BRIEF DESCRIPTION OF THE DRAWINGS

FIG. 1 is a top plan view of the invention;

FIG. 2 is a side elevation of the invention;

FIG. 3 is an end elevation of the invention;

FIG. 7 is a fragmentary bottom plan view, taken along the line 7—7 of FIG. 2, looking in the direction of the arrows;

FIG. 8 is an exploded perspective view of the rotor, rotor mount and unloading attachment;

FIG. 9 is a perspective view of the screen removed from the body;

FIG. 10 is an end elevation of the unloading attachment illustrated in FIG. 8;

FIG. 11 is an end elevation of a second unloading attachment; and

FIG. 12 is an end elevation of a third unloading attachment.

DESCRIPTION OF THE PREFERRED EMBODIMENT

Figure 4:
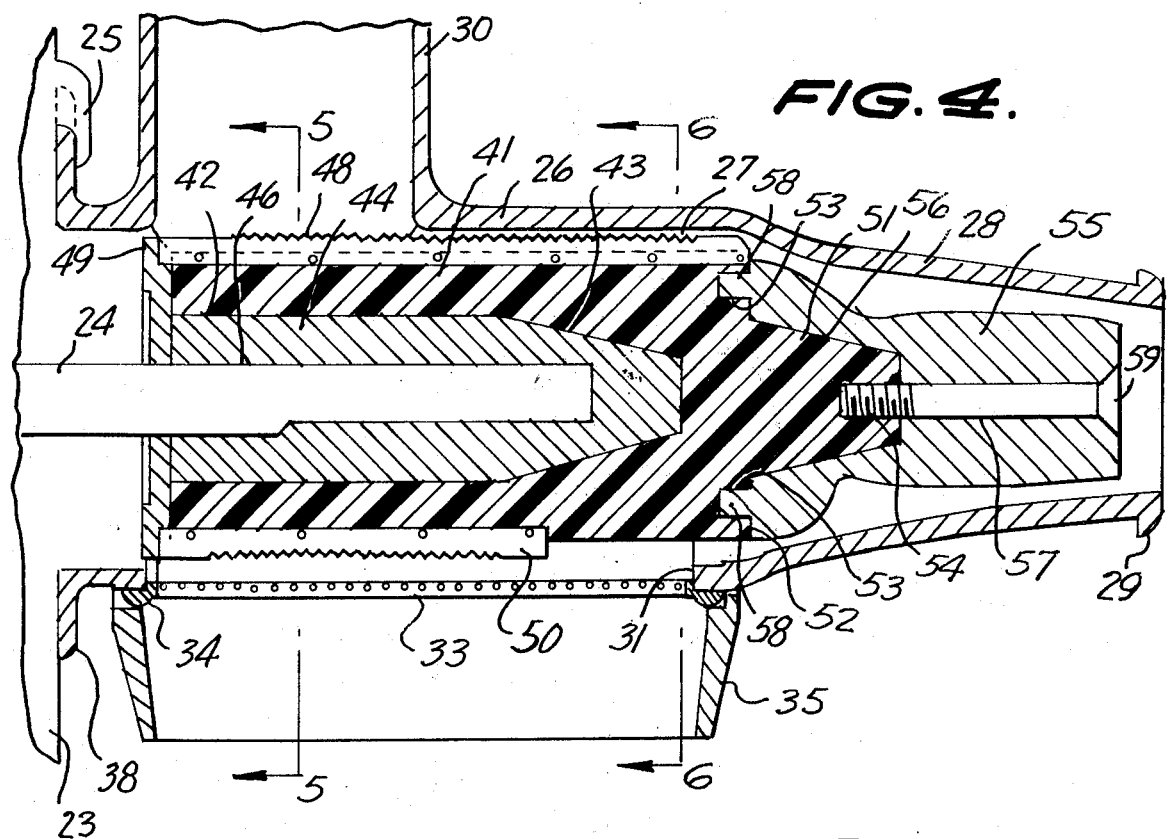
FIG. 4 is an enlarged fragmentary vertical sectional view, taken along the line 4—4 of FIG. 1, looking in the direction of the arrows.
Figures 5, 6:
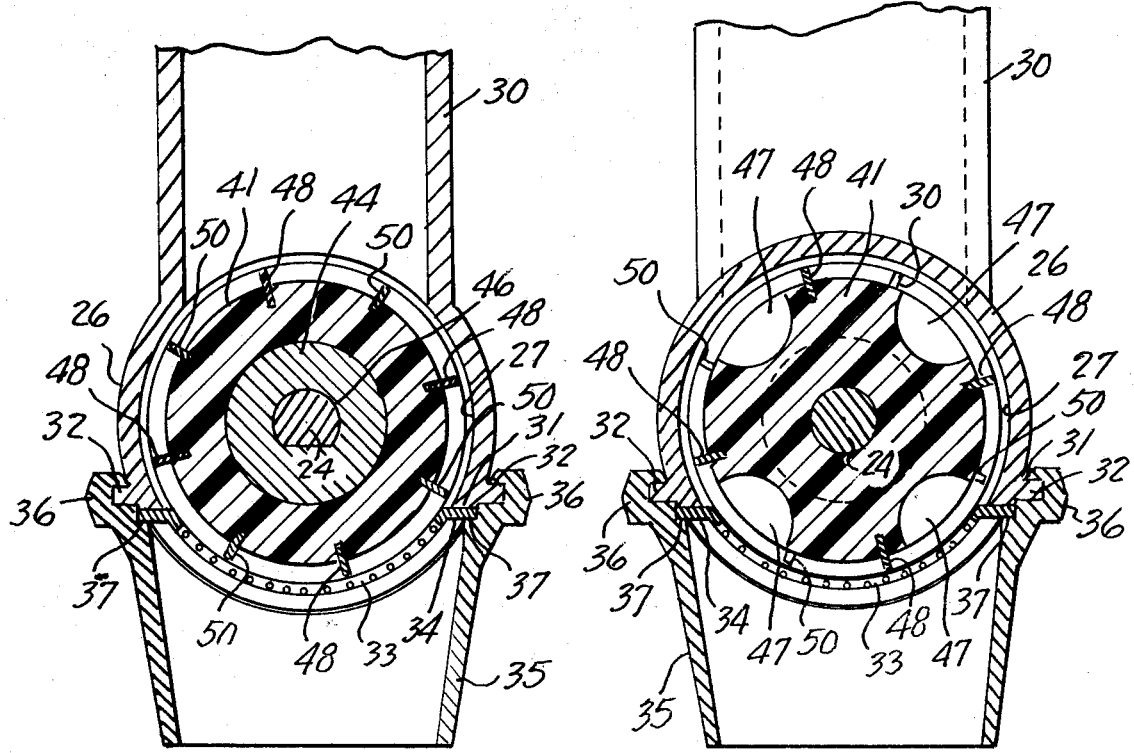
FIG. 5 is a fragmentary transverse sectional view, taken along the line 5—5 of FIG. 4, looking in the direction of the arrows.
FIG. 6 is a fragmentary transverse sectional view, taken along the line 6—6 of FIG. 4, looking in the direction of the arrows.

Referring now to the drawings in detail, wherein like reference characters indicate like parts throughout the several figures, the reference numeral 20 indicates generally, a juicer constructed in accordance with the invention.

The juicer 20 includes an electric motor 21 supported on a base 22. The electric motor 21 is provided with an end plate 23 through which the motor shaft 24 extends. The end plate 23 is secured to the motor by conventional through bolts. The end plate 23 is provided with a plurality of ears 25 arranged in radially outwardly equi-spaced relation from the shaft 24 and in circumferentially equi-spaced relation to each other.

A juicer body 26 has a generally cylindrical hollow chamber 27 formed therein and terminating in an outwardly tapering nozzle 28 having a circumferential flange 29 on its outer end.

The body 26 has a hopper 30 integrally formed thereon and extending upwardly therefrom communicating with the chamber 27.

The body 26 has a generally rectangular opening 31 formed in the lower face thereof throughout the generally cylindrical chamber 27. A pair of elongate generally horizontal flanges 32 are arranged in spaced parallel relation on opposite sides of the opening 31 for the entire length thereof.

A semi-cylindrical juicer screen 33 completely covers the openings 31 and is provided with a generally rectangular nylon frame 34 which is adapted to engage the bottom of the body 26 surrounding the opening 31. A spout 35 has a pair of spaced parallel channel waves 36 integrally formed along the upper edges thereof and opening inwardly for sliding engagement with the flanges 32. The spout 35 is provided with a pair of shoulders 37 for engagement with the frame 34 to detachably support the screen 33 in its position covering the opening 31.

The body 26 is provided with a circumferential flange 38 on the motor end thereof and the flange 38 has a plurality of outwardly opening notches 39 formed therein for engaging over the ears 25. A stop 40 extends outwardly on the flange 38 for alignment engagement with one of the ears 25. When it is desired to attach the body 26 to the end cap 23 of the motor 21 the notches 39 are aligned with the ears 25 and the housing 26 is moved until the flange 38 engages the end cap 23. The body 26 is then turned until the stop 40 comes in contact with the uppermost ear 25 as can be seen in FIG. 3 completing the connection of the body 26 to the end cap 23. The body 26 may be removed from the end cap 23 by reversing the above operation.

A generally cylindrical molded nylon rotor 41 is provided with an axial bore 42 terminating in a generally conical socket 43. A generally cylindrical bushing 44 having a conical extension 45 on one end thereof is adapted to seat in the bore 42 as can be seen in FIG. 4. The bushing 44 has a bore 46 formed therein to receive the shaft 24 of the motor 21.

The rotor 41 has a plurality of semi-cylindrical recesses 47 formed in the outer circumference thereof extending from substantially midway of length thereof to the end having the conical socket 43 formed therein.

A plurality of saw tooth cutter blades 48 extend from a circumferential flange 49 on the inner end of the rotor 41 along the surface of the rotor 41 parallel to its axis. The saw blades 48 are molded into the surface of the rotor 41 and are rigidly mounted therein. A plurality of saw tooth cutter blades 50 are similarly mounted in the surface of the rotor 41 and have a length somewhat shorter then the blades 48.

The rotor 41 has a conical extension 51 on the end thereof opposite the motor 21. The largest diameter of the conical extension 51 is substantially smaller than the external diameter of the rotor 41 to form a shoulder 52 between the rotor 41 and the extension 51. Bores 53 open inwardly of the shoulder 52 and extend parallel to the axis of the rotor 41. A threaded axial bore 54 is formed in the extension 51.

A pulp unloading auger generally indicated at 55 is provided with a conical socket 56 which is adapted to engage over the conical extension 51. An axial bore 57 extends from the conical socket 56 through the outer end of the unloading auger 55. A pair of pins 58 on the inner end of the auger 55 engage in the bores 53 to prevent relative rotation between the auger 55 and the rotor 41. An elongate bolt 59 extends through the bore 57 and is threaded into the threaded bore 54 in the conical extension 51 to tightly but removeably secure the auger 55 to the rotor 41. The auger 55 has screw thread lands 60 formed thereon with the lands 60 developing a ¼ turn from end to end.

A second screw threaded auger 55a is provided with screw threaded lands 60a which extend through ½ turn from end to end. A third screw threaded auger 55b is provided with screw threaded lands 60b which pass through ¾ of a turn from end to end. The augers 55, 55a and 55b are interchangeably used in the juicer 20 for unloading the pulp from differing materials being juiced.

A disposal sack 61 is shown in broken lines in FIGS. 1 and 2 and is adapted to be fitted over the flange 29 on the nozzle 28.

In the use and operation of the invention food stuffs to be juiced are dropped into the hopper 30 and are forced downwardly into contact with the cutters 48, 50 on the rotor 41 with the rotor 41 turning due to power from the motor 21. The food stuffs are cut to a very fine degree with the juices passing outwardly through the screen 33 and the pulp being forced outwardly through the nozzle 28. The auger 55 is used for unloading discarded pulp from rooty or solid vegetables while the auger 55a is designed for maximum efficiency in unloaded discarded pulp from all leafy green vegetables. The auger 55b is provided for maximum efficiency in the making of all homogenized food such as vegetables, fruits, nut butters, ice creams and sherberts.

In FIG. 9 a semi-circular plate 62 is illustrated with a nylon frame 63. The plate 62 replaces the screen 33 when it is desired to use the juicer 20 for homogenizing any type of fruit, vegetable or when making ice cream, sherbert or nut butter. The plate 62 is positioned in its frame 63 so as to be substantially closer to the cutters 48, 50 then the screen 33.

Having thus described the preferred embodiment of the invention it should be understood that numerous structural modifications and adaptations may be resorted to without departing from the spirit of the invention.

What is claimed is:

1. As a new article of manufacture, a power juicer embodying a body having a hollow formation, an electric motor detachably connected to said body, a motor shaft projecting into said body, a hopper mounted on said body, there being an opening on the underside of said body and said opening having a generally rectangular formation, a screen of semicylindrical formation for covering said opening, said screen including a rectangular frame surrounding said opening, a spout detachably affixed to said body and underlying said opening, a pair of shoulders on said spout engaging said frame, a nozzle integrally formed on the end of the body opposite said motor and said nozzle having a conical taper, a rotor of generally cylindrical formation mounted on said shaft within said hollow body, said rotor having an axial bore that terminates in a socket of generally conical formation, a bushing of generally cylindrical formation provided with a conical extension at one end thereof that is seated in the bore in said rotor, said bushing being provided with a bore for receiving the shaft of the motor, a plurality of semicylindrical recesses formed in the outer circumference of said rotor and extending from substantially midway of the length thereof to the end having the conical socket formed therein, a first plurality of cutter blades projecting from the inner end of the rotor along the surface of the rotor parallel to its axis, said blades being molded into the surface of the rotor and being rigidly mounted therein, a plurality of second cutter blades mounted in the surface of the rotor and said second blades having a length somewhat shorter than the first blades, said rotor being provided with a conical extension on the end thereof opposite the motor, and wherein the largest diameter of the conical extension is substantially smaller than the external diameter of the rotor to provide a shoulder between the rotor and the extension, a plurality of bores opening inwardly of said last named shoulder and projecting parallel to the axis of the rotor, said extension having a threaded axial bore formed therein, a screw threaded unloading attachment embodying a pulp unloading auger having a conical socket for engaging over the conical extension, there being an axial bore extending from the conical socket through the outer end of the unloading auger, said auger having screw thread lands formed thereon, and a plurality of pins on the inner end of the auger engaging in the bores for preventing relative rotation between the auger and said rotor.

* * * * *